Sept. 1, 1936. M. HESSENLAND ET AL 2,053,031
METHOD OF PRODUCING RESIN FROM TREES
Filed Nov. 15, 1934
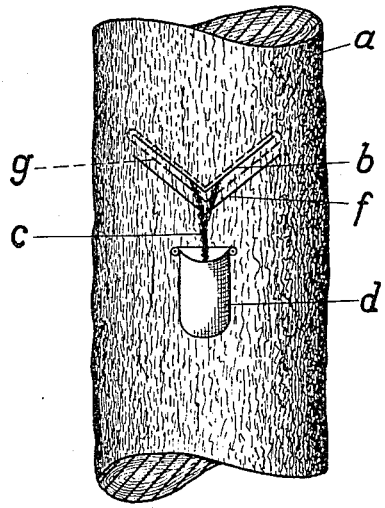
Inventors.
Max Hessenland.
Helmut Kublun.
Hans Splitter.
By Stone, Boyden & Mach.
Attorneys.

Patented Sept. 1, 1936

2,053,031

UNITED STATES PATENT OFFICE 2,053,031

METHOD OF PRODUCING RESIN FROM TREES

Max Hessenland, Konigsberg, Helmut Kublun, Gumbinnen, and Hans Splitter, Stralsund, Germany Application November 15, 1934, Serial No. 753,226
In Germany August 15, 1933

5 Claims. (Cl. 47—10)

This invention relates to an improved method for increasing the production of resin at the tree.

It is known that for producing resin from trees the trees must be wounded at their trunks and that the resin running out from this wound is gathered. In these known methods the quantity of the produced resin depends in general on the variety and qualities of the tree. The present invention pertains to a method by which the quantity of the thus produced resin is increased and the flow of resin accelerated. The invention is not limited to any specific variety of trees.

The invention resides in the procedure by which the trunk wound is treated with a means accelerating the flow of the resin. Such a means may be simply designated as stimulus. According to the invention there are suitable as such stimuli chemicals, acids, salts, alkalies either pure or in solution or mixtures thereof, also oxidizing or reducing materials and alcohols, ethers, aldehydes, phenols or the like. These stimuli may be brought into touch in any suitable manner with the wound on the trunk, for instance by tipping on, spraying on or blowing as dust.

Customarily, the trunks of trees are wounded by scarifying or scratching. It is customary to repeat the scratching from time to time, the cuts or tearings (scratches) being provided at a certain distance from each other. Furthermore the invention provides that the second and the following incisions or tearings (scratches) are arranged in such a manner that they are located without the zone of the bark and the tree fibre influenced by the stimulus.

The method according to the invention is schematically illustrated by means of the enclosed drawing.

In the drawing $a$ is a view of a trunk of a tree. For carrying out the method according to the invention the trunk of the tree is provided with a first incision $b$. This incision is of the usual form and may be connected with a drip channel $c$ over which the resin flows to a reservoir $d$. According to the invention a chemical medium, for instance calcium chlorid, potash, or sulfuric acid, is introduced into the incision $b$, viz. by tipping on, spraying on or blowing as dust. The best results were obtained by the blowing as dust. The second incision $f$ to be arranged after a certain time is located so spaced from the first incision $b$ that it will be situated without the zone $g$ of the bark of the tree influenced by the chemical stimulus. This second incision too is provided with a chemical means. If necessary, further incisions may be provided.

The method according to the invention accelerates substantially the flow of the resin. Demonstrations have shown that one incision results in about the double quantity of the resin.

We claim:—

1. In a method of obtaining resin from trees, the formation of a wound in the tree bark and in the wood beneath the bark, shortly after the formation of the wound the treatment of the open fresh wound with intensive short stimulation with a chemical agent, and collecting the resin flowing from the wound.

2. In a method of obtaining resin from trees, the formation of a series of wounds in the bark of the tree and in the wood beneath the bark, shortly after the formation of each wound the treatment of each open fresh wound with intensive short stimulation with a chemical agent, and collecting the resin flowing from each wound, adjacent wounds being so positioned that they are outside the zone influenced by the stimulating agent used on each separate wound.

3. In a method of obtaining resin from trees, the formation of a wound in the tree bark and in the wood beneath the bark, shortly after the formation of the wound the treatment of the open fresh wound with intensive short stimulation with an acid agent, and collecting the resin flowing from the wound.

4. In a method of obtaining resin from trees, the formation of a wound in the tree bark and in the wood beneath the bark, shortly after the formation of the wound the treatment of the open fresh wound with intensive short stimulation with an alkali, and collecting the resin flowing from the wound.

5. In a method of obtaining resin from trees, the formation of a wound in the tree bark and in the wood beneath the bark, shortly after the formation of the wound the treatment of the open fresh wound with intensive short stimulation with a salt, and collecting the resin flowing from the wound.

MAX HESSENLAND.
HELMUT KUBLUN.
HANS SPLITTER.